United States Patent [19]

Miller et al.

[11] Patent Number: 5,036,884
[45] Date of Patent: Aug. 6, 1991

[54] MOUNTING MEANS FOR FLUID PRESSURE TRANSMITTERS

[75] Inventors: Randall J. Miller; Alan F. Chou, both of Sugar Land, Tex.

[73] Assignee: Keystone International Holdings Corp.

[21] Appl. No.: 615,126

[22] Filed: Nov. 19, 1990

[51] Int. Cl.⁵ .............................................. G01F 1/34
[52] U.S. Cl. .................................. 137/597; 137/270; 73/756
[58] Field of Search ............... 137/269, 270, 597, 884; 73/756

[56] References Cited

U.S. PATENT DOCUMENTS

| | | |
|---|---|---|
| 2,871,881 | 2/1959 | Hewson ............................ 137/597 |
| 3,450,157 | 6/1969 | Hewson . | |
| 4,319,492 | 3/1982 | Hewson et al. ...................... 73/756 |
| 4,453,417 | 6/1984 | Mayers et al. ..................... 73/756 X |
| 4,920,626 | 1/1990 | Nimberger . | |

OTHER PUBLICATIONS

Precision General, Inc. Catalog DMS489 (3 Folded Sheets).
Rosemount Product Data Sheet 2622 (2 pages).
Anerson Greenwood Bulletin 2-291-M65A (3 Folded Sheets).

Primary Examiner—John C. Fox
Attorney, Agent, or Firm—Dodge Bush Moseley & Riddle

[57] ABSTRACT

A mounting plate (20) is positioned between a manifold (18) and a pair of fluid pressure transmitters including a differential pressure transmitter (22) and a gauge pressure transmitter (24). The fluid pressure from high and low pressure taps or lines (14, 16) placed on opposite sides of a flow restriction (12) of a main flow line (10) is measured and transmitted to a remote location by the transmitters (22, 24). The mounting plate (20) has low and high pressure ports (62, 64) for differential pressure transmitter (22) and a low pressure port (66) for a gauge pressure transmitter (24). A connecting fluid passage (68) connects the low pressure ports (62, 66) and a block valve (80) is movable between open and closed positions to permit or block fluid communication between the ports (62, 66) and fluid communication between the transmitters (22, 24). One pair of ports (66, 76) are arranged in symmetrical relation to the other pair of ports (62, 64) to permit the mounting plate (20) to be utilized with the gauge pressure transmitter (24) for measurement of either a low pressure or a high pressure.

20 Claims, 5 Drawing Sheets

FIG.8
(ROTATED 90°)

MOUNTING MEANS FOR FLUID PRESSURE TRANSMITTERS

BACKGROUND OF THE INVENTION

This invention relates to mounting means for fluid pressure transmitters in fluid communication with a main flow line, and more particularly to a common mounting means for both a differential pressure transmitter and a gauge pressure transmitter.

Normally, a flow restriction is placed in a main flow line transporting a fluid and pressure taps are made on each side of the restriction for obtaining high and low fluid pressures. Such a flow restriction may comprise an orifice plate, flow nozzle, or venturi tube, for example. The high and low pressures taken from opposed sides of the restriction in the main flow line are communicated to a transmitter for measuring and transmitting the measured pressure or pressure differential by a suitable electronic signal or the like to a remote location, such as a control room, where the pressure or pressure differential may be monitored and/or recorded by an operator.

Gas flow measurements in a main flow line across a reduced diameter orifice require several variable inputs including the differential pressure and the gauge or static pressure. A separate installation has normally been provided for each of the pressure transmitters with each installation normally utilizing a pair of orifice taps or ports one on each side of the reduced installation normally utilizing a pair of orifice taps or ports one on each side of the reduced diameter orifice. The use of two separate installations for flow measurement through a main flow line increases the possibility of malfunction from possible leakage at the connecting joints or improper installation, as well as requiring a relatively large amount of space for the two installations.

A manifold is normally mounted between the main flow line and the pressure transmitters. The manifold permits blocking or venting of the pressure lines to the transmitters which may be required for proper calibration of the transmitters. While a single installation from the main flow line has been used heretofore for a differential pressure transmitter and a gauge pressure transmitter, the transmitters have been mounted on separate sides of the manifold or have been mounted in a series relation to each other with the gauge pressure transmitter being downstream from the differential pressure transmitter. Such an arrangement sometimes makes it difficult for "rodding" or cleaning through passages and valve seats, and usually requires utilization of the manifold for calibration of the transmitters.

SUMMARY OF THE INVENTION

This invention is particularly directed to mounting means for a differential pressure transmitter and a gauge pressure transmitter in fluid communication with a main flow line while utilizing only a single set of taps or ports for a reduced diameter orifice or restriction in the main flow line. The mounting installation preferably is mounted directly to the main flow line or positioned closely adjacent the main flow line and an improved precision in measuring the change in pressure is provided from the single set of ports as pressure pulses or waves from the fluid in the main flow line are transmitted practically instantaneously to the pressure transmitters, which normally include flexible diaphragms for measuring the fluid pressure.

A manifold is mounted closely adjacent the main flow line and is connected to the pair of pressure taps or lines from the main flow line. The manifold is normally used to control flow to a pressure transmitter while permitting blocking, venting, zero checks, and calibration, and includes five valves each movable between open and closed positions relative to a flow passage in the manifold.

An important feature of the present invention is an adapter or mounting plate for supporting both a differential pressure transmitter and a gauge pressure transmitter. The mounting plate has opposed planar sides or surfaces mounted between the manifold and the pressure transmitters with the fluid flow to the differential pressure transmitter from the manifold being along a straight axis through the mounting plate. The mounting plate may have its flow passages and associated valve seats to the transmitters cleaned with a rod or "rodded out". The gauge pressure transmitter is positioned downstream from the differential pressure transmitter and a block valve in the mounting plate blocks fluid communication or flow to the gauge pressure transmitter when it is desired to calibrate the differential pressure transmitter. Further, the mounting plate is provided with suitable flow passaging to permit the gauge pressure transmitter to measure either low pressure or high pressure from the main flow line by a reversal of the connections to the mounting plate. Normally, the gauge pressure transmitter measures the low pressure side of the orifice in the main flow line, but it may be desired under certain conditions for the gauge pressure transmitter to measure the high pressure side of the orifice in the main flow line and the same mounting plate may be utilized for such high pressure measurement.

It is an object of this invention to provide a single installation for a differential pressure transmitter and a gauge pressure transmitter on a main flow line in fluid communication with a single pair of pressure taps or lines on opposed sides of a reduced diameter orifice in the main flow line.

It is a further object of this invention to provide mounting means for such an installation including a mounting plate for both the differential pressure transmitter and gauge pressure transmitter positioned between the manifold and the transmitters.

Another object is to provide a mounting installation directly on the main flow line with the high pressure line and the low pressure line from the main flow line being along a straight axis to the differential pressure transmitter through the manifold and through the mounting plate.

An additional object is to provide such a mounting plate between a manifold and the transmitters with the gauge pressure transmitter being downstream of the differential pressure transmitter so that fluid communication to the gauge pressure transmitter may be blocked for calibration or venting of the differential pressure transmitter.

Other objects, features, and advantages of this invention will be apparent from the following drawings and specification.

DESCRIPTION OF THE INVENTION

Figure 1:
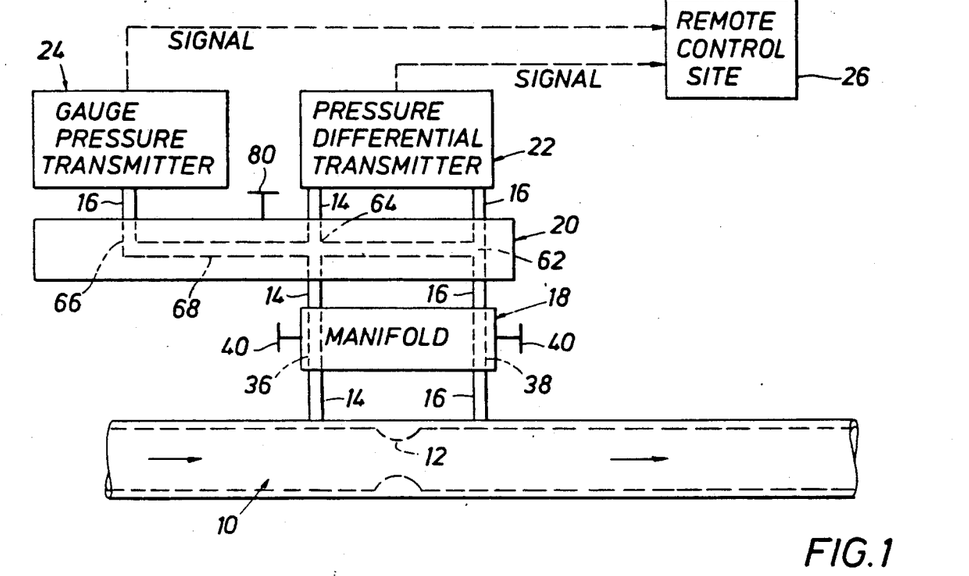
FIG. 1 is a schematic of a system for measuring fluid pressure in a main flow line utilizing the present invention in which a differential pressure transmitter and a gauge pressure transmitter are mounted on a manifold in fluid communication with a pair of fluid pressure taps on opposed sides of a restriction in the main flow line.
Figure 2:
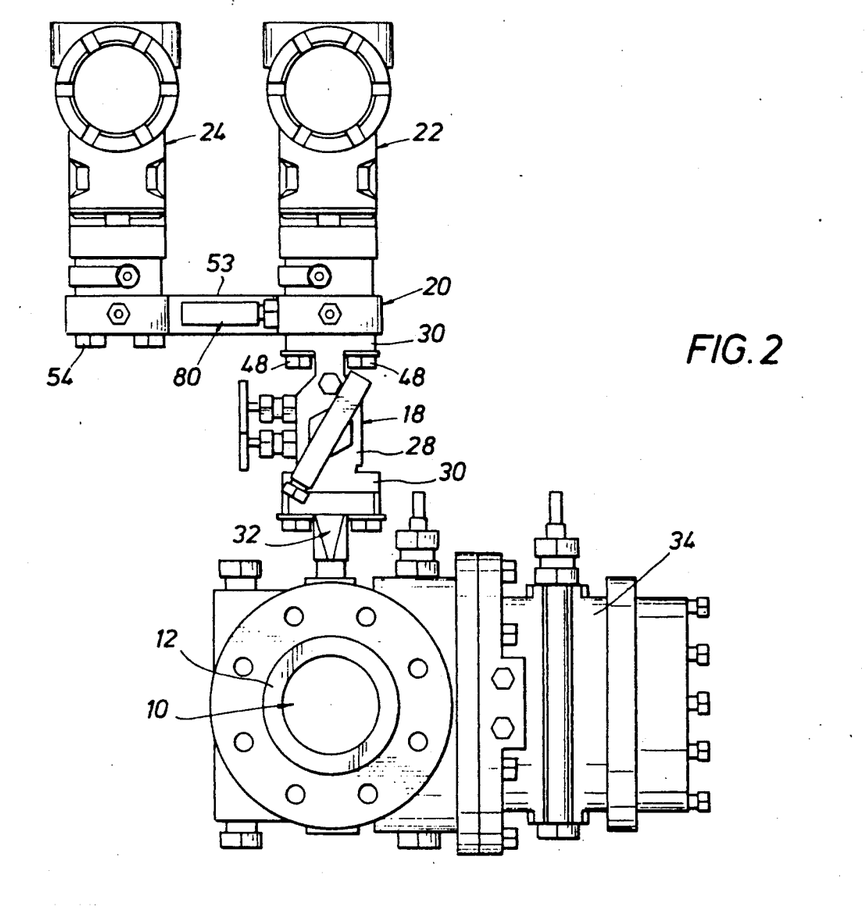
FIG. 2 is an elevation of one embodiment of the pressure measuring and transmitting assembly of the present invention mounted directly on a main flow line.

Referring to the embodiment shown in FIGS. 1-6, and more particularly to the pressure measuring and transmitting system shown schematically in FIG. 1, the main flow line is generally indicated at 10 having a flow restriction 12 therein which provides a fluid pressure drop as well known. Flow restriction 12 may be in the form of an orifice plate, flow nozzle, or venturi, as well known. A high pressure fluid tap or line is shown at 14 and a low pressure fluid tap or line is shown at 16 on opposed sides of restriction 12. A housing 17 is connected to flow line 10 as shown in FIG. 2 for mounting restriction or orifice plate 12 within flow line 10. High and low pressure lines 14, 16 are in fluid communication with a five valve manifold generally shown at 18 and well known in the art as will be explained further below.

High and low pressure lines 14, 16 extend along a straight axis through suitable flow passages in manifold 18 to a mounting plate generally illustrated at 20 on which a differential pressure transmitter 22 and a gauge pressure transmitter 24 are mounted. Differential pressure transmitter 22 is in fluid communication along a straight axis with both the high pressure line 14 and the low pressure line 16 from main flow line 10 for measuring the differential pressure on opposite sides of restriction 12 while gauge pressure transmitter 24 is in fluid communication with low pressure line 16 downstream from differential pressure transmitter 22 to measure the fluid pressure on the low pressure side of restriction 12. In some instances it may be desirable for gauge pressure transmitter 24 to measure the fluid pressure on the high pressure side of restriction 12 and mounting plate 20 may also be utilized for that purpose as will be explained.

Transmitters 22 and 24 normally include a pressure transducer and an associated electronic head for measuring the fluid pressure and then transmitting an electronic signal indicating the measured fluid pressure or differential pressure to a remote control site as shown at 26 where the fluid pressure may be recorded and/or visually displayed for monitoring. Transmitters 22 and 24 are well known in the art and are commercially available. For example, differential pressure transmitter 22 may be purchased as Model 3051CD, Rosemount Incorporated, Eden Prairie, Minn. and gauge pressure transmitter 24 may be purchased under Model 3051CG of Rosemount Incorporated.

Fluid pressure transmitters normally utilize a diaphragm for measurement of the fluid pressure and it is desirable to have the fluid pressure transmitter as close to the restriction 12 in main flow line 10 as possible. Pressure surges occur from compressor stations along the flow line and it is desirable to provide a large number of measurements that an average differential pressure can be obtained for increased accuracy. An increase or decrease in fluid pressure at restriction 12 effects a pressure pulse or wave which is received by the diaphragm of the transmitter and such a pulse travels at the speed of sound. Thus, a practically instantaneous measurement may be provided from a mounting of the measuring and transmitting assembly directly on the flow line which transports a gaseous fluid. In order to obtain maximum accuracy, the flow passages to the transmitters from the flow line should be at least around ⅜ inch diameter to minimize attenuation or amplification of the pressure pulse and the flow passages should be cleaned periodically by rodding. Additionally, it is noted that the fluid pressure from main flow line 10 to differential pressure transmitter 22 is preferably transmitted along a straight constant diameter flow path or passage thereby to obtain maximum precision in pressure measurement.

Figure 3:
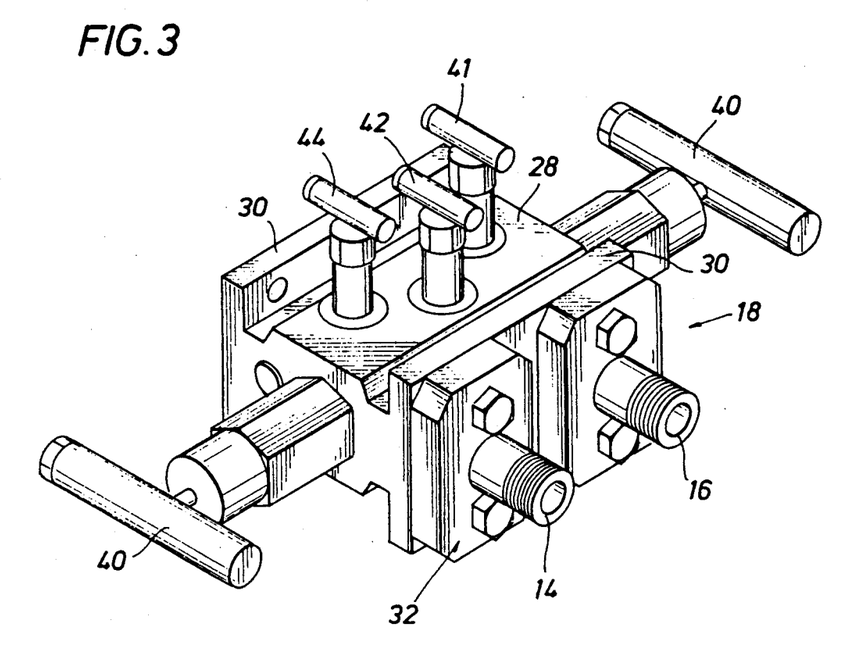
FIG. 3 is a perspective of a five valve manifold of the pressure measuring and transmitting assembly of FIG. 2 positioned between the main flow line and the mounting plate for the gauge pressure transmitter and the differential pressure transmitter.
Figure 4:
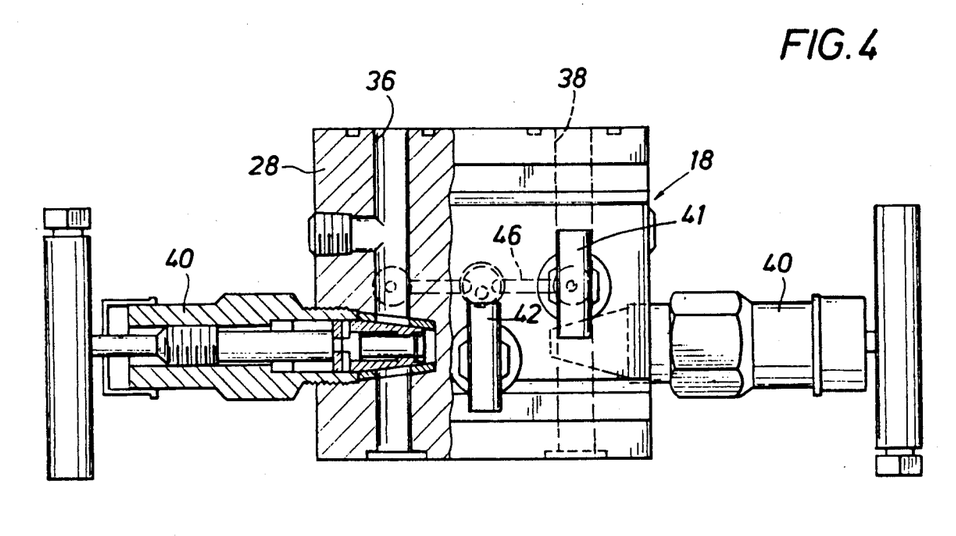
FIG. 4 is a plan view, partly in section, of the manifold shown in FIG. 3.

Mounting plate 20 forms an important part of this invention and is positioned between manifold 18 and transmitters 22 and 24. Both transmitters 22 and 24 are mounted on mounting plate 20 with gauge pressure transmitter 24 being positioned on mounting plate 20 downstream from differential pressure transmitter 22. Fluid communication from flow line 10 to transmitters 22 and 24 is controlled by manifold 18 which is a five valve manifold. As shown in FIGS. 3 and 4, manifold 18 has a body 28 with opposed flanges 30 for connection to mounting plate 22 and a fitting generally indicated at 32 for connection to fluid pressure taps or lines 14, 16 from flow line 10.

Manifold 18 has a high pressure flow passage 36 and a low pressure flow passage 38 therethrough in communication with respective pressure lines 14 and 16. Manifold 18 is available commercially as Model M65A from Anderson Greenwood & Company, Houston, Tex. Hand valves 40 movable between open and closed positions control fluid flow from pressure lines 14 and 16 to transmitters 22, 24. Suitable block and bleed valves 41, 42 and 44 are provided for blocking or venting to atmosphere either the high pressure side or the low pressure side of transmitter 22 and 24. A connecting flow passage 46 extends between passages 36 and 38. For example, if desired to vent to atmosphere the low pressure side, valves 40 and 44 are closed. Then valves 41 and 42 are opened to permit fluid flow from transmitters 22 and 24 through passages 38 and 46 to the vent port opened by valve 42. Similarly, the high pressure side may be vented to atmosphere by closing valve 40 and opening valves 42 and 44. Bleeding of fluid from transmitters 22, 24 may be desired for repair or replacement, removal of contaminated fluids, or calibration, for example.

Figure 5:
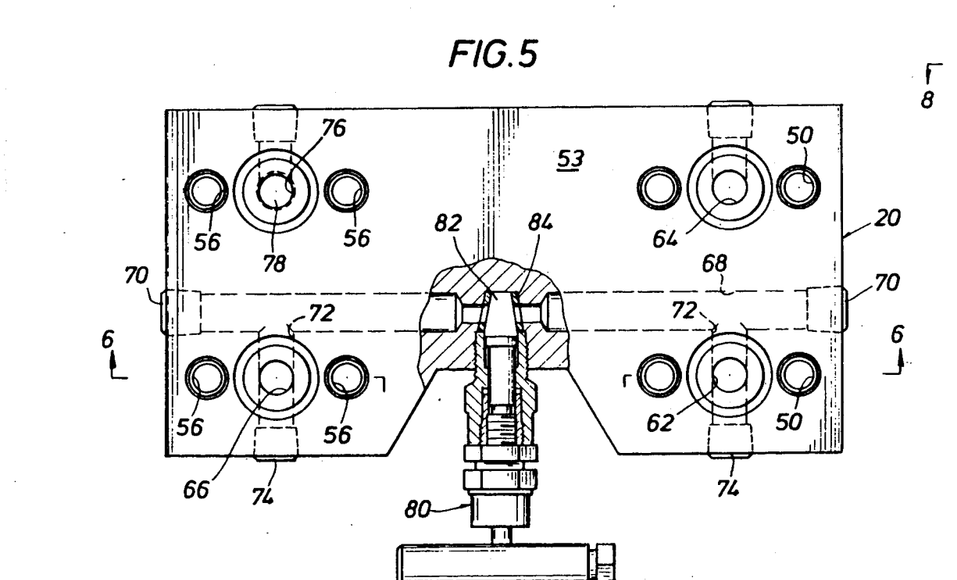
FIG. 5 is a plan view of the mounting plate with certain parts broken away for showing fluid communication between the differential pressure transmitter and the gauge pressure transmitter.
Figure 6:
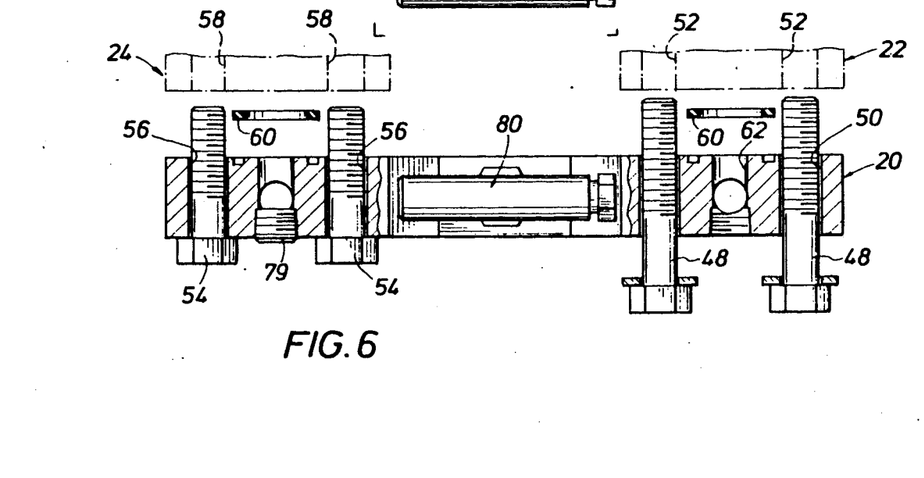
FIG. 6 is a side elevation, with certain parts broken away, of the mounting plate of FIG. 5.
Figure 7:
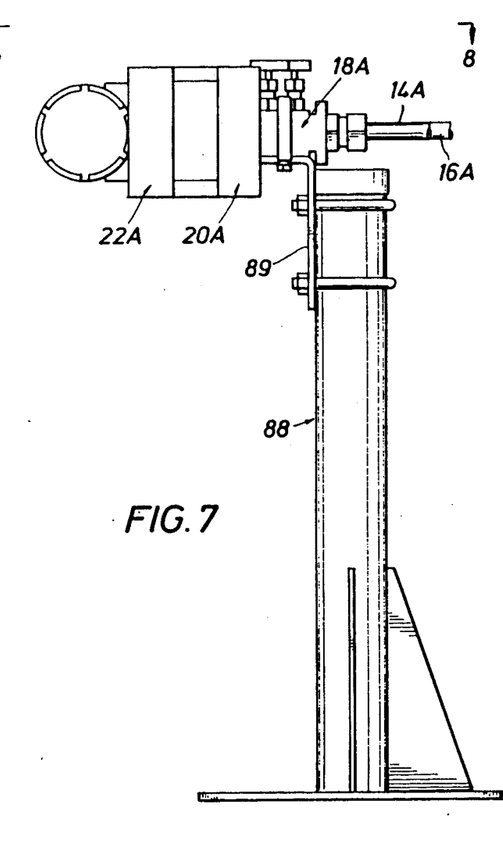
FIG. 7 is an elevation of a modification of the pressure measuring and transmitting assembly mounted on a stand adjacent the main flow line and showing the differential pressure transmitter mounted on a planar face of the mounting plate and the gauge pressure transmitter on a side of the mounting plate at right angles to the differential pressure transmitter.
Figure 8:
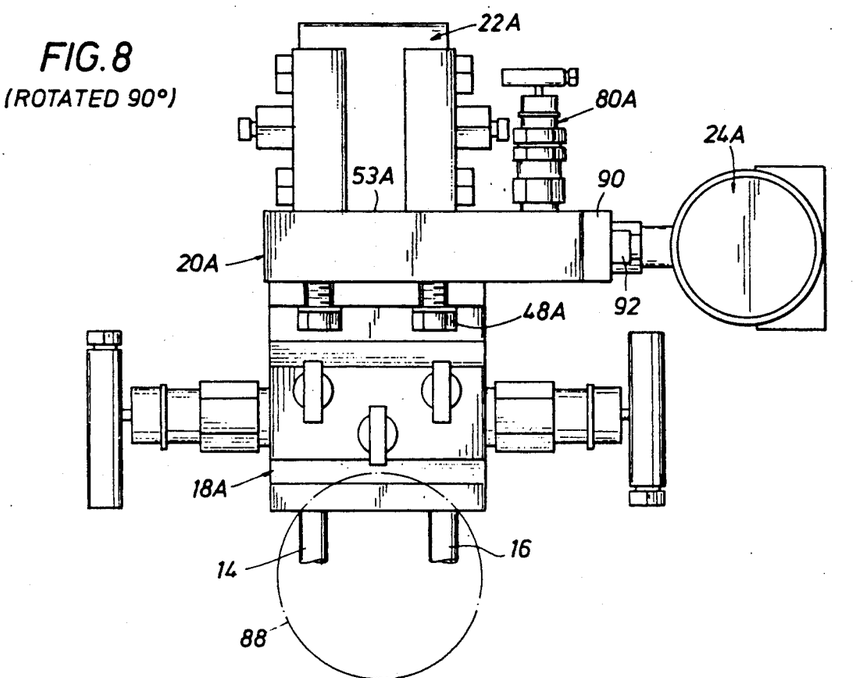
FIG. 8 is a plan of the modified pressure measuring and transmitting assembly shown in FIG. 7 taken generally along line 8—8 of FIG. 7 but rotated 90°.
Figure 9:
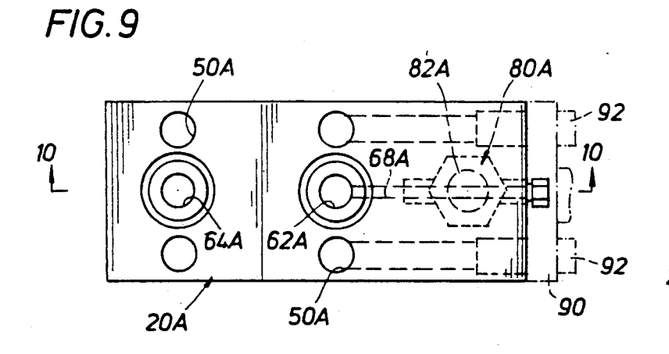
FIG. 9 is a plan of the mounting plate shown removed from the assembly of FIGS. 7 and 8.
Figure 10:
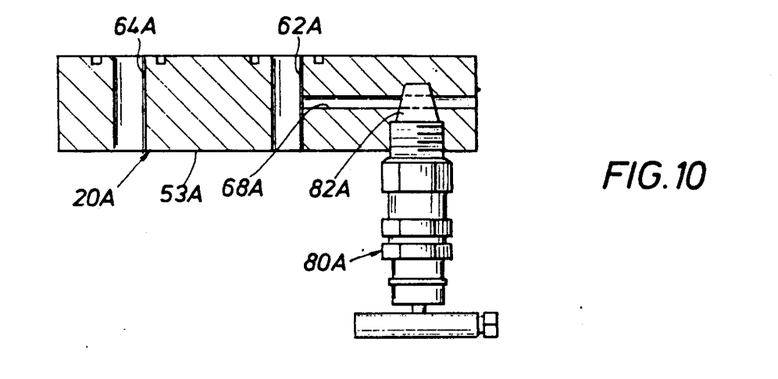
FIG. 10 is a section taken generally along line 10—10 of FIG. 9.
Figure 11:
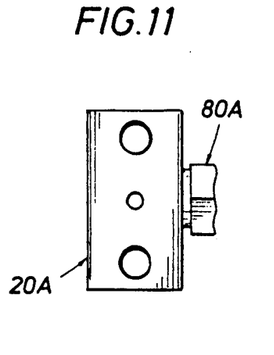
FIG. 11 is an end elevation of the mounting plate shown in FIGS. 9 and 10.

Referring now to FIGS. 5 and 6 in which mounting plate 20 is illustrated, bolts 48 extend through openings 50 for securing plate 20 onto adjacent flange 30 of manifold 18 and for threading within aligned openings 52 of differential pressure transmitter 22. Mounting plate 20 has an upper planar surface 53 on which transmitters 22 and 24 are supported and a lower parallel planar surface 55 in contact with flange 30 of manifold 18. Bolts 54 extend through openings 56 within aligned threaded openings 58 in gauge pressure transmitter 24 for mounting transmitter 24 thereon. Suitable elastomeric seal rings 60 are mounted on grooves between plate 20 and transmitters 22, 24 for sealing therebetween. Low pressure port 62 is in straight axial alignment with low pressure flow passage 38 of manifold 18 and high pressure port 64 is in straight axial alignment with high pressure flow passage 36 of manifold 18. Ports 62 and 64 are in fluid communication with suitable diaphragms (not shown) in differential pressure transmitter 22 for measuring the differential pressure. A low pressure port 66 is in fluid communication with a suitable diaphragm (not shown) in gauge pressure transmitter 24 for measuring the low pressure. A longitudinally extending flow passage 68 extends the length of plate 20 and has end plugs 70 therein. Transverse branch flow passage 72 having end plugs 74 extends between flow passage 68 and low pressure ports 62 and 66 thereby to provide fluid communication between ports 62 and 66. Port 76 is not a live port as shown in FIGS. 5 and 6 and is plugged at 78. Port 66 is plugged at 79.

In the event it is desired to block fluid communication between low pressure ports 62 and 66, a hand operated plug valve indicated generally at 80 has a plug 82 on its extending end received within a tapered valve seat 84 in flow passage 68. Valve 82 is shown in a closed position in FIG. 5 as might be desired for venting or bleeding gauge pressure transmitter 24 from manifold 18.

At times, it may be desired for gauge pressure transmitter 24 to measure high pressure instead of low pressure, and mounting plate 20 is adapted to be utilized for this purpose. A particular installation will normally be installed for measuring either high pressure or low pressure and mounting plate 20 may be utilized for either installation without the requirement of having separate mounting plate. Plate 20 may be rotated 180° in a horizontal plane relative to manifold 18 and transmitters 22, 24 as viewed in FIG. 2. In this position, port 66 would be beneath differential pressure transmitter 22 in fluid communication with high pressure line 14 upon removal of plug 79 and port 62 would be beneath gauge pressure transmitter 24 in fluid communication with port 66 through line 68. Port 76 would be beneath differential pressure transmitter 22 in fluid communication with low pressure line 16 upon removal of plug 78. Thus, gauge pressure transmitter 24 would be measuring the high fluid pressure in main flow line 10. It is noted in FIG. 1 that pressure lines 14 and 16 are shown schematically as extending on opposite sides of mounting plate 20 in order to illustrate fluid communication between main flow line 10 and differential pressure transmitter 22. It is noted that ports 66, 76 are positioned on plate 20 in symmetrical relation to ports 62 and 66.

Referring now to FIGS. 7-10, another embodiment of this invention is shown mounted on a stand indicated generally at 88 and positioned adjacent main flow line 10. Such a stand or separate support may be desirable when main flow line 10 is subjected to substantial vibration from pressure surges or the like. A support bracket 89 secured to stand 88 supports a manifold 18A thereon and high and low pressure lines 14 and 16 extend to manifold 18A from an associated main flow line (not shown). Oftentimes, a main flow line, such as a pipeline, will vibrate and it is desirable to mount any instrumentation on a separate stand adjacent the flow line. Manifold 18A is a five valve manifold similar to manifold 18 in the embodiment of FIGS. 1-6. Mounting plate 20A is bolted by bolts 48A to manifold 18A through openings 50A. Differential pressure transmitter 22A is in fluid communication with high pressure line 14A through port 62A and with low pressure line 16A through port 64A. Suitable bolts (not shown) secure differential pressure transmitter 22A to the upper planar surface 53A of mounting plate 20A.

Gauge pressure transmitter 24A has a flange 90 secured by bolts 92 to a side of mounting plate 20A. A fluid passage 68A in communication with port 62A provides low pressure fluid to gauge pressure transmitter 24A for measurement. Thus, transmitters 22A and 24A extend at right angles to each other. If desired for gauge pressure transmitter 24A to measure high pressure, mounting plate 20A may be rotated along with differential pressure transmitter 24A 180° so that port 62A is in fluid communication with high pressure line 14.

Figure 12:
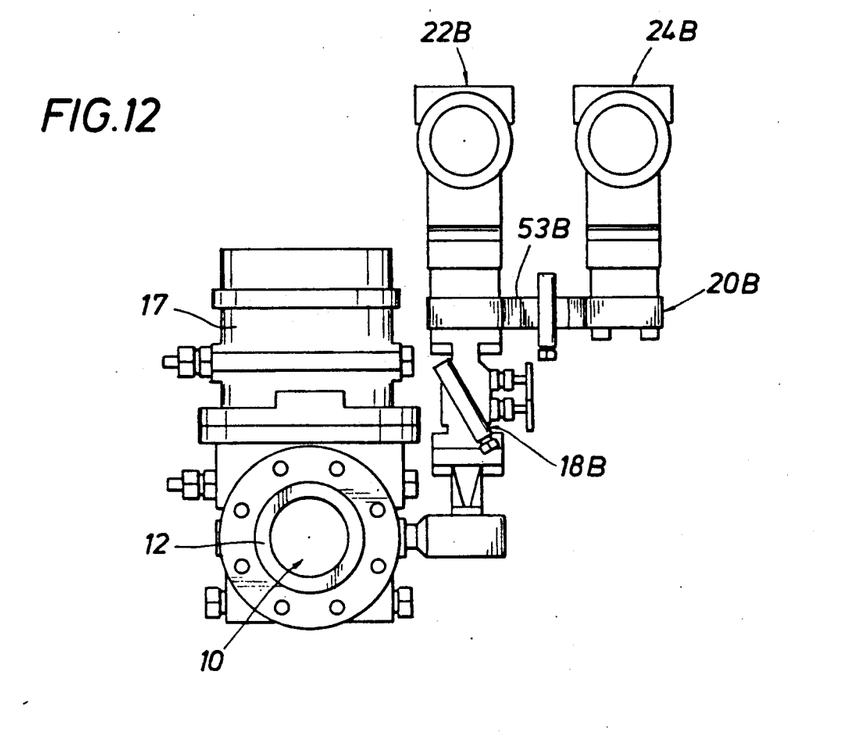
FIG. 12 is a front elevation of a further modification of the pressure measuring and transmitting assembly of the present invention showing a manifold connected directly to a side of a main flow line with the transmitter mounting plate extending in a horizontal direction.

Referring to FIG. 12 another embodiment of the present invention is shown in which a manifold 18B is mounted on a side of main flow line 10 at restriction 12 and supports mounting plate 20B. Differential pressure transmitter 22B and gauge pressure transmitter 24B are supported on planar surface 53B of mounting plate 20B. Mounting plate 20B is similar to mounting plate 20 of the embodiment of FIGS. 1-6 and extends in a generally horizontal direction.

Figure 13:
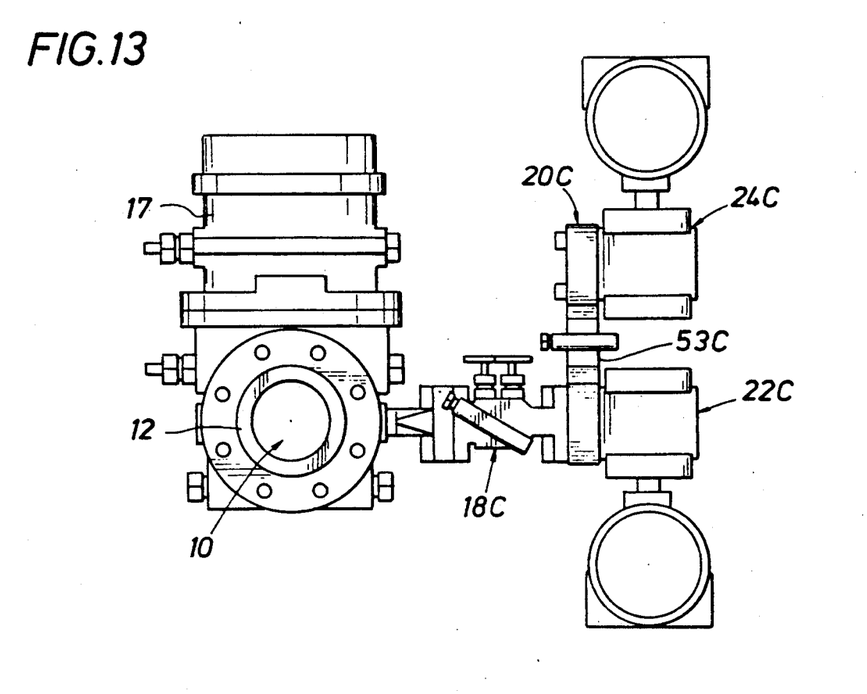
FIG. 13 is an additional modification of the pressure measuring and transmitting assembly of the present invention showing a manifold connected directly to a side of main flow line with the mounting plate extending in a generally vertical direction and the transmitters extending in opposite directions from each other.

Referring to FIG. 13, an additional embodiment of the present invention is illustrated in which a mounting plate 20C is secured to manifold 18C supported from a side of flow line 10. Differential pressure transmitter 22C and gauge pressure transmitter 24C are supported on planar surface 53C of mounting plate 20C which extends in a generally vertical direction. Transmitters 22C and 24C extend in opposite direction from each other. Mounting plate 20C is similar to mounting plate 20 shown in the embodiment of FIGS. 1-6.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A fluid measuring and transmitting assembly for transmitting to a remote location measurements of fluid pressure in a main flow line in fluid communication with a pair of fluid taps on opposed sides of a reduced diameter orifice in said main flow line; said fluid measuring and transmitting assembly comprising:
    a valve manifold having a high pressure flow passage and a low pressure flow passage in fluid communication with said pair of fluid taps;
    a transmitting mounting plate mounted on said valve manifold and having high and low pressure flow passages therein in fluid communication with said high and low flow passages in said manifold;
    a differential pressure transmitter mounted on said mounting plate and having high and low pressure flow passages therein in fluid communication with said high and low flow passages in said mounting plate for measuring the fluid pressure differential between said high and low flow passages; and
    a gauge pressure transmitter mounted on said mounting plate having a flow passage in fluid communication with a predetermined one of said high and low flow passages in said mounting plate for measuring and transmitting the measurement to a remote location.

2. A fluid measuring and transmitting assembly for transmitting measurements of fluid pressure in a main flow line as set forth in claim 1;
    said gauge pressure transmitter being in fluid communication with said low pressure flow passage in said mounting plate downstream of said differential pressure transmitter.

3. A fluid measuring and transmitting assembly for transmitting measurement of fluid pressure in a main flow line as set forth in claim 1;
    said gauge pressure transmitter being in fluid communication with said high pressure flow passage in said mounting plate downstream of said differential pressure transmitter.

4. A fluid measuring and transmitting assembly for transmitting measurements of fluid pressure in a main flow line as set forth in claim 1;
    said mounting plate having a block valve in said flow passage communication with said gauge pressure transmitter movable between open and closed positions therein.

5. A fluid measuring and transmitting assembly for transmitting measurements of fluid pressure in a main flow line as set forth in claim 1;
    said mounting plate including an additional flow passage to permit said mounting plate selectively to be connected between said manifold and said transmitters with said gauge pressure transmitter in fluid communication with the other of said high and low flow passages.

6. A fluid measuring and transmitting assembly for transmitting measurement of fluid pressure in a main flow line as set forth in claim 1;
    means connecting said manifold to a side of said main flow line and supporting said manifold, mounting plate, and pressure transmitters therefrom.

7. A fluid measuring and transmitting assembly for transmitting measurements of fluid pressure in a main flow line as set forth in claim 1;
    a stand adjacent said main flow line supporting said manifold, mounting plate, and pressure transmitters thereon.

8. A fluid measuring and transmitting assembly for transmitting measurements of fluid pressure in a main flow line as set forth in claim 1;
    said mounting plate being of a generally rectangular cross section and defining parallel inner and outer planar surfaces;
    said inner planar surface being in face to face contact with said manifold and said outer planar surface being in face to face contact with said gauge pressure transmitter and said differential pressure transmitter.

9. A fluid measuring and transmitting assembly for transmitting measurements of fluid pressure in a main flow line as set forth in claim 8;
    said mounting plate having a first pair of ports therein extending between said inner and outer surfaces and in fluid communication with said high and low flow passages in said manifold, said differential pressure transmitter being in fluid communication with said first pair of ports;
    said mounting plate having a second pair of ports extending therethrough between said inner and outer surfaces and adapted for being in fluid communication with said high and low flow passages in said manifold, said gauge pressure transmitter being in fluid communication with a selected one of said second pairs of ports to permit measurement of a selected high or low pressure.

10. A fluid measuring and transmitting assembly for transmitting measurements of fluid pressure in a main flow line as set forth in claim 9;
    said gauge pressure transmitter being connected to said low pressure port of said second pair of ports;
    a flow passage in said mounting plate extending between the low pressure ports of said first and second pairs of ports, and a block valve in said flow passage between said low pressure ports for selectively blocking fluid communication between said low pressure ports.

11. A fluid measuring and transmitting assembly for transmitting measurements of fluid pressure in a main flow line as set forth in claim 10;
    said mounting plate adapted for rotation of 180° in a plane perpendicular to the longitudinal axes of said flow passages and subsequent connection to said manifold with said flow passage and low pressure port in said mounting plate being reversed and connected in fluid communication with said high pressure flow passage of said manifold thereby to permit measurement of the high pressure in said flow line by said gauge pressure transmitter.

12. Apparatus for measuring fluid pressure in a main flow line and for transmitting the measurements to a remote location from a pair of fluid pressure lines on opposed sides of a reduced diameter orifice in said main flow line; said apparatus comprising:
    a valve manifold having a straight high pressure flow passage and a straight low pressure flow passage therethrough in parallel relation to each other and in fluid communication with said pair of fluid pressure lines to said main flow line;
    a mounting plate secured to said manifold and having straight high and low pressure flow passages in straight axial alignment with said high and low flow passages in said manifold, said mounting plate having inner and outer planar surfaces with said inner planar surface being in contact with said manifold;
a differential pressure transmitter mounted on said outer planar surface of said mounting plate and having high and low pressure flow passages in axial alignment with said high and low flow passages of said mounting plate for measuring the differential fluid pressure between said high and low flow passages and transmitting the measurement to a remote location; and
a gauge pressure transmitter mounted on said outer planar surface of said mounting plate downstream of said differential pressure transmitter and in fluid communication downstream with a predetermined one of said high and low flow passages in said mounting plate for measuring the fluid pressure therein and transmitting the measurement to a remote location.

13. Apparatus as set forth in claim 12 wherein said gauge pressure transmitter is in fluid communication with said low pressure flow passage, and a connecting flow passage in said mounting plate extends between the low pressure flow passage for said differential fluid pressure transmitter to said gauge pressure transmitter for transmitting fluid pressure thereto.

14. Apparatus as set forth in claim 13 wherein means permit said mounting plate to be removed from said manifold and rotated 180° in a plane perpendicular to the longitudinal axes of said flow passages for subsequent mounting on said manifold in fluid communication with said low pressure and high pressure fluid passages of said manifold.

15. Apparatus as set forth in claim 12 wherein a block valve is mounted on said mounting plate for movement between open and closed positions relative to said connecting flow passage for selectively blocking fluid communication to said gauge pressure transmitter.

16. Apparatus as set forth in claim 12 wherein one half of said mounting plate has a first pair of ports extending therethrough in parallel relation to each other to provide said straight high and low pressure flow passages therein in fluid communication with said differential pressure transmitter; and
the other half of said mounting plate has a second pair of ports extending therethrough positioned on said plate in a generally symmetrical relation to said first pair of ports one of said second pair of ports being in fluid communication with said gauge pressure transmitter, the other of said second pair of ports being inactive and not in fluid communication with said gauge pressure transmitter.

17. Apparatus as set forth in claim 16 wherein said second pair of ports are adapted to be positioned in straight axial fluid communication with said high and low flow passages of said valve manifold and in straight axial alignment with said high and low flow passages of said differential pressure transmitter upon rotation of said mounting plate 180° in a plane perpendicular to the longitudinal axes of said flow passages.

18. A transmitter mounting plate adapted to be positioned between a valve manifold and a pair of fluid pressure transmitters with the valve manifold and one of said fluid pressure transmitters having straight axially aligned low and high fluid passages therein in fluid communication with a pair of fluid pressure taps on opposed sides of a reduced diameter orifice in a main flow line; said mounting plate comprising:
a body of a generally rectangular cross section and being of a generally rectangular shape as viewed in plan, said body having an inner planar surface adapted to be positioned in face to face contact with said manifold and an outer planar surface adapted to be positioned in face to face contact with said pair of fluid pressure transmitters;
a first pair of ports extending through the plate in parallel relation to each other to provide straight high and low flow passages therein adapted to be in straight fluid communication with said low and high flow passages in said valve manifold and one of said fluid pressure transmitters; and
a second pair of ports extending through said plate in parallel relation to each other and positioned on said plate in a generally symmetrical relation to said first pair of ports, one of said second pair of ports being in fluid communication with the other of said fluid pressure transmitters and the other of said second pair of ports being inactive and not in fluid communication with said other of said fluid pressure transmitters; and a connecting flow passage extends between one of said ports of said first pair and one of said ports of said second pair.

19. The mounting plate as set forth in claim 17 wherein said second pair of ports are adapted to be positioned in straight axial alignment with said low and high fluid passages of said valve manifold and said one of said fluid pressure transmitters upon rotation of said mounting plate 180° in a plane perpendicular to the longitudinal axes of said flow passages.

20. The mounting plate as set forth in claim 17 wherein
a block valve is mounted on said mounting plate for movement between open and closed positions relative to said connecting flow passage.

* * * * *